(12) United States Patent
Agricole et al.

(10) Patent No.: US 7,644,630 B2
(45) Date of Patent: Jan. 12, 2010

(54) GEARBOX SIMULATION TEST BENCH

(75) Inventors: Christian Agricole, Oursebelille (FR); Raphaël Cres, Aureilhan (FR); Laurent Dubois, Ger (FR); Alain Habas, Orleix (FR)

(73) Assignee: Renault s.a.s., Boulogne Billancourt (FR)

( * ) Notice: Subject to any disclaimer, the term of this patent is extended or adjusted under 35 U.S.C. 154(b) by 0 days.

(21) Appl. No.: 11/908,421

(22) PCT Filed: Mar. 10, 2006

(86) PCT No.: PCT/FR2006/050213

§ 371 (c)(1),
(2), (4) Date: Apr. 10, 2008

(87) PCT Pub. No.: WO2006/097655

PCT Pub. Date: Sep. 21, 2006

(65) Prior Publication Data

US 2008/0281567 A1 Nov. 13, 2008

(30) Foreign Application Priority Data

Mar. 14, 2005 (FR) .................................. 05 02491

(51) Int. Cl.
*G01L 3/02* (2006.01)
(52) U.S. Cl. ........................................................ 73/856
(58) Field of Classification Search .................. 73/856, 73/115.01–115.05, 116.01, 118.01–118.02
See application file for complete search history.

(56) References Cited

U.S. PATENT DOCUMENTS

| | | | | |
|---|---|---|---|---|
| 3,962,912 A | * | 6/1976 | Borie | 73/116.01 |
| 4,070,901 A | * | 1/1978 | McDonald | 73/1.41 |
| 4,466,279 A | | 8/1984 | Gable et al. | |
| 4,656,876 A | * | 4/1987 | Fremd | 73/865 |
| 5,029,683 A | * | 7/1991 | Grunberg et al. | 192/3.55 |
| 5,113,704 A | * | 5/1992 | Yano et al. | 73/162 |
| 5,209,141 A | * | 5/1993 | Asayama et al. | 477/154 |
| 5,496,229 A | * | 3/1996 | Miyamoto | 477/111 |
| 6,766,684 B2 | * | 7/2004 | Bertz et al. | 73/116.01 |
| 6,807,852 B2 | * | 10/2004 | Ranchin | 73/116.01 |

FOREIGN PATENT DOCUMENTS

EP     0 860 692     8/1998

* cited by examiner

*Primary Examiner*—Max Noori
(74) *Attorney, Agent, or Firm*—Oblon, Spivak, McClelland, Maier & Neustadt, L.L.P.

(57) ABSTRACT

The invention relates to a test bench that reproduces the performance of a gearbox. The invention consists of: at least one gearshift module (2) comprising a linear motor (12) and a ball joint (14) that can be used to convert a linear motion of the motor (12) into a rotational motion of a gearshift shaft (5) and a force sensor (17) that can be used to measure the force applied to the gearshift shaft (5). In particular embodiments of the invention, the test bench also comprises a vertical linear selection module or a horizontal selection module. The modules employed can be used to simulate forces as a function of the shift and selection position in a manner that is representative of a gearbox.

20 Claims, 4 Drawing Sheets

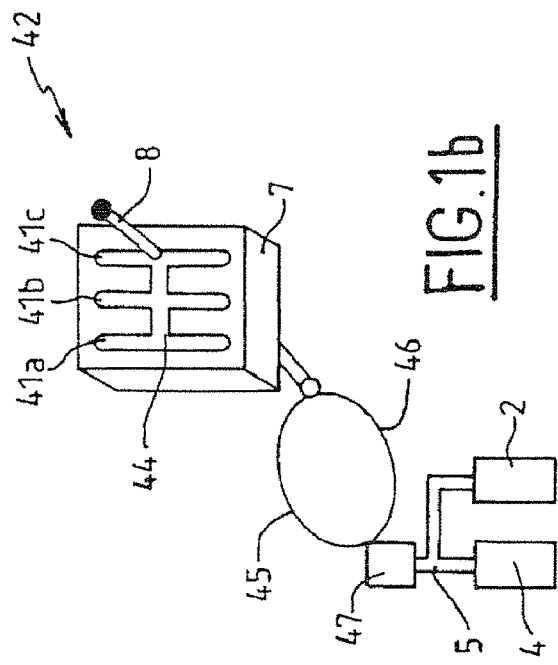
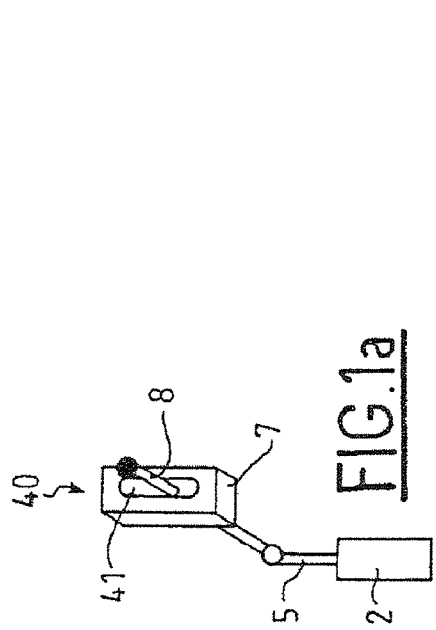
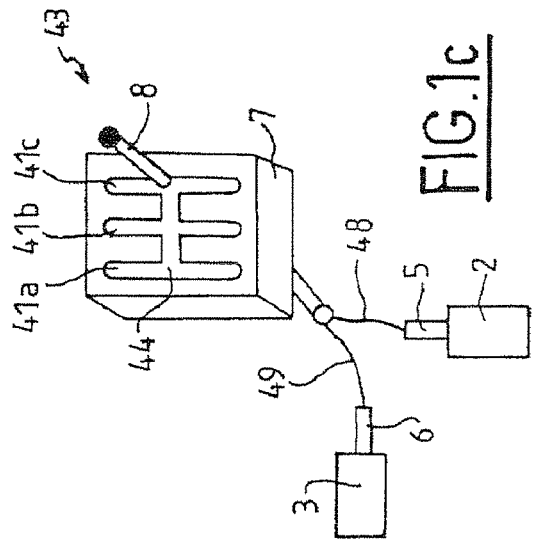
FIG.1a
FIG.1b
FIG.1c

GEARBOX SIMULATION TEST BENCH

BACKGROUND OF THE INVENTION

I. Field of the Invention

The technical field of the present invention is that of test benches to simulate gearboxes, for example, vehicle gearboxes.

II. Description of Related Art

In the field of application of test benches, it is sometimes necessary to simulate a gearbox and this is particularly true of test benches for external control of gearboxes.

Test benches using pneumatic rams are currently known in the field of test benches that simulate gearboxes.

Such devices have the major disadvantage, on account of the use of pneumatic rams, of lacking in precision and above all of having performance that is limited in terms of responsiveness and in terms of dynamic range.

BRIEF SUMMARY OF THE INVENTION

The present invention overcomes these disadvantages by proposing a test bench that simulates a gearbox making it possible to generate loads equivalent to those of an actual gearbox and reproducing various aspects of behavior, according to the type of gearbox parametrized.

The subject of the invention is a test bench of the type that reproduces the behavior of a gearbox, characterized in that it comprises at least one gearshift module consisting of a linear motor and of a ball joint allowing a linear movement of the motor to be converted into a rotary movement of a gearshift shaft, and of a load sensor allowing the load applied to the gearshift shaft to be measured.

According to one feature of the invention, the linear motor moves translationally with respect to a slideway along a horizontal axis and the gearshift shaft pivots about a substantially vertical axis.

According to another feature of the invention, the test bench comprises a horizontal selection module consisting of a linear motor and of a ball joint allowing a linear movement of the motor to be converted into a rotary movement of a selection shaft, and of a load sensor allowing the load applied to the selection shaft to be measured.

According to another feature of the invention, the linear motor moves with respect to a slideway along a horizontal axis, and the selection shaft pivots about its substantially horizontal axis.

According to another feature of the invention, the test bench comprises a vertical selection module consisting of a linear motor, a tension/compression load sensor and a compensating means.

According to another feature of the invention, the linear motor moves with respect to a slideway along a vertical axis so as to cause the gearshift shaft to move translationally along its substantially vertical axis.

One advantage of the device according to the invention is that it allows the behavior of different types of gearbox to be reproduced.

Another advantage of the device according to the invention lies in its speed and in its precision when actuating the external controls.

Another advantage of the device according to the invention lies in the fact that it uses modules that are independent of one another and can readily be moved.

BRIEF DESCRIPTION OF THE DRAWINGS

Other features, details and advantages of the invention will become more clearly evident from the detailed description given hereinafter by way of indication with reference to the drawings in which:

FIGS. 1a to 1c depict functional diagrams illustrating applications of the test bench according to the invention.

DETAILED DESCRIPTION OF THE INVENTION

Figure 2:
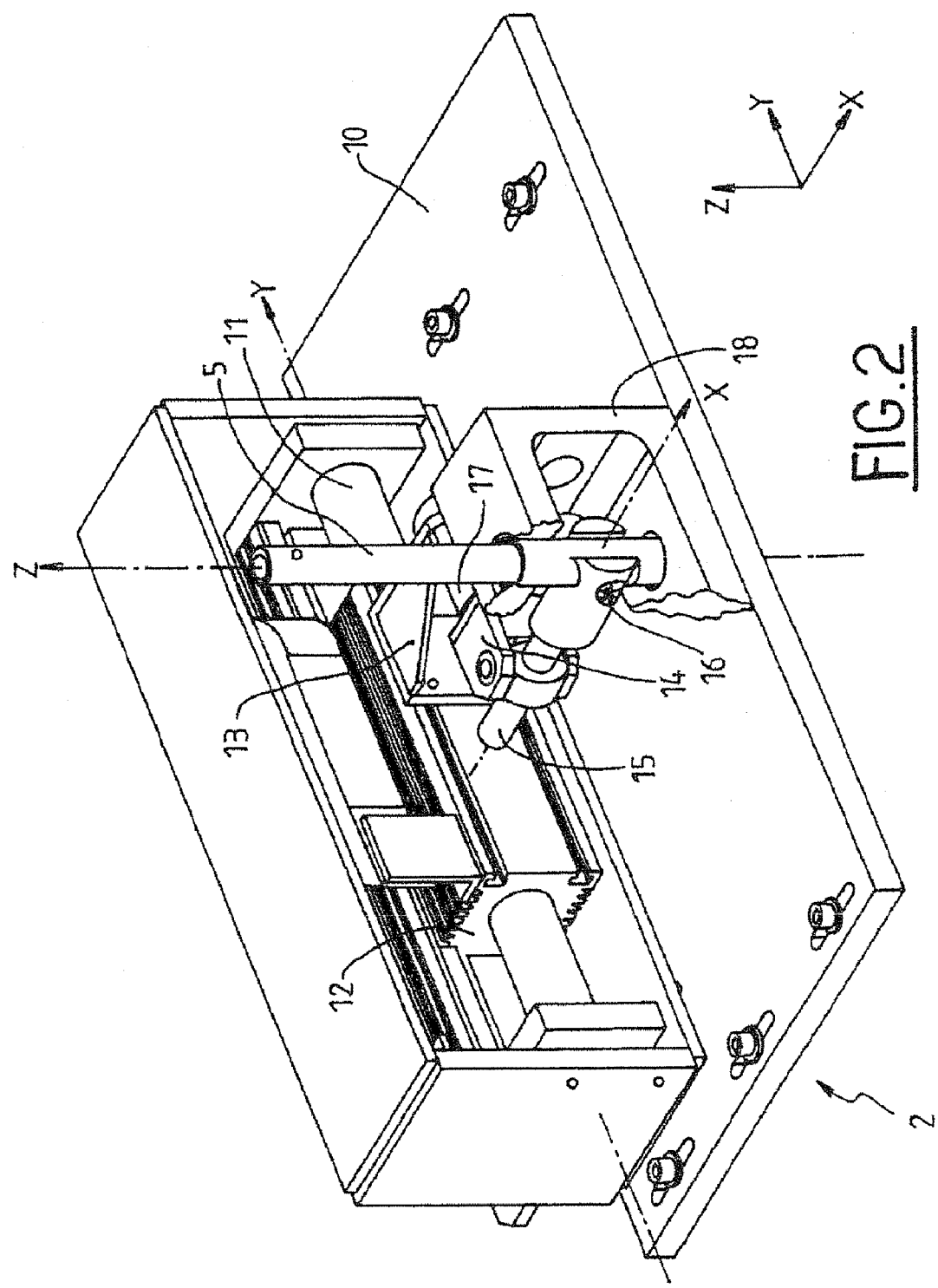
FIG. 2 is a perspective depiction of one embodiment of the gearshift module 2.

The test bench that the present invention proposes to produce is a test bench that simulates a gearbox. More specifically, this test bench needs to reproduce various aspects of behavior corresponding to different types of gearbox. This test bench is particularly intended for gearbox external controls.

The gearboxes conventionally used are in the form of an automatic box or of a manual box.

FIG. 1a illustrates a first type of gearbox simulated by the invention. This type of gearbox is the automatic gearbox type 40. Mechanically controlled automatic gearboxes 40 are conventionally actuated by an external control 7 comprising a lever 8 moving along a longitudinal segment 41. The lever 8 therefore allows the mode P, R, N or D to be selected and allows gears to be changed manually (M+ or M−). In this case, only the gearshift module is used. For this type of box, only the gearshift mode corresponding to a torque about a substantially vertical axis needs to be simulated using a gearshift module 2 actuating a gearshift shaft connected to the lever 8.

FIG. 1b illustrates a second type of gearbox simulated by the invention. This type of gearbox is the manual gearbox type 42 with combined gear selection and gear shift. Manual gearboxes with combined selection and shifting are conventionally actuated by an external control 7 performed by a lever moving along a gate in the shape of a double "H". The horizontal bar 44 of the gate corresponds to the neutral position (where no gear is engaged). The movement of the lever 8 in order to select the gear for the gear shift is broken down into a horizontal selection movement along the horizontal axis 44 of the gate and into a gearshift movement, along one of the three vertical axes 41a, 41b, 41c of the gate. The lever 8 is connected at its lower end to two cables 45 and 46 actuating an interconnection module 47. Movement along the horizontal axis 44 drives the first cable 45, while a gearshift drives the second cable 46. The interconnection module 47 (conventionally embodied in the form of a combination of link rods) allows the movements of these two cables 45, 46 to be converted into a vertical load and a torque about a vertical axis.

The control supplied to the gearbox is therefore a control combining a vertical selection control and a gearshift control. These two controls are transmitted to the box by a single component 5 (cable or shaft, for example). In this type of gearbox, the vertical selection mode, corresponding to a load along a substantially vertical axis, and the gearshift mode, corresponding to a torque about a substantially vertical axis, need to be simulated using a vertical selection module 4 and a gearshift module 2 acting on the same shaft 5.

FIG. 1c illustrates a third type of gearbox which is the manual gearbox type with separate gear selection and gearshift 43. Manual gearboxes in which the gears are selected and shifted separately are conventionally actuated by an external control 7 performed by a lever moving along a gate in the shape of a double "H". The horizontal bar 44 of the gate corresponds to the neutral position (where no gear is engaged). The movement of the lever 8 in order to select the gear for the gear shift is broken down into a horizontal selection movement along the horizontal axis 44 of the gate and into a gearshift movement, along one of the three vertical axes 41a, 41b, 41c of the gate. The control supplied to the gearbox is therefore a control combining a horizontal selection control and a gearshift control. These controls are transmitted to the gearbox separately by the two distinct cables 48, 49 acting on shafts 5 and 6. In this type of gearbox, the horizontal selection mode, corresponding to a torque about a substantially horizontal axis, and the gearshift mode, corresponding to a torque about a substantially vertical axis, need to be simulated using a horizontal selection module 3 and a gearshift module 2 acting on two distinct components (shafts or cables).

The test bench according to the invention allows these three types of gearbox to be simulated by using a gearshift module 2, a horizontal selection module 3 and a vertical selection module 4.

FIG. 2 is a perspective depiction of one embodiment of the gearshift module 2. In this embodiment, the gearshift module 2 consists of a plate 10 secured to the frame of the test bench (not depicted in its complexity), of a horizontal slideway 11 secured to the plate 10, of a linear motor 12 able to move along the slideway 11 along a horizontal axis, and of an arm support 13, supporting an arm 15 by means of a ball joint 14. The arm 15 is secured to a control shaft 5 by a pivot connection provided by means of an axis substantially perpendicular to the axis Z of the control shaft 5. A guide device 18 secured to the plate 10 assists in guiding the rotation of the control shaft 5 about its substantially vertical axis Z, for example by means of a rolling bearing. The gearshift module 2 also comprises a load sensor 17 allowing the load applied to the gearshift shaft 5 to be measured. It may, for example, be possible to use a tension/compression sensor 17 positioned between the arm support 13 and the ball joint 14.

Embodying the gearshift module 2 in this way allows the horizontal linear movement of the motor 12 to be converted into a rotary movement of the shaft 5.

Use of a horizontal linear motor is particularly advantageous because such a motor is not disturbed by the forces generated by its own weight, allowing it to move very quickly and very precisely and therefore to subject the gearshift shaft 5 to rapid and very precise rotational movements. Such precision could not be achieved using a rotary motor or a device embodied using rams.

Figure 3:
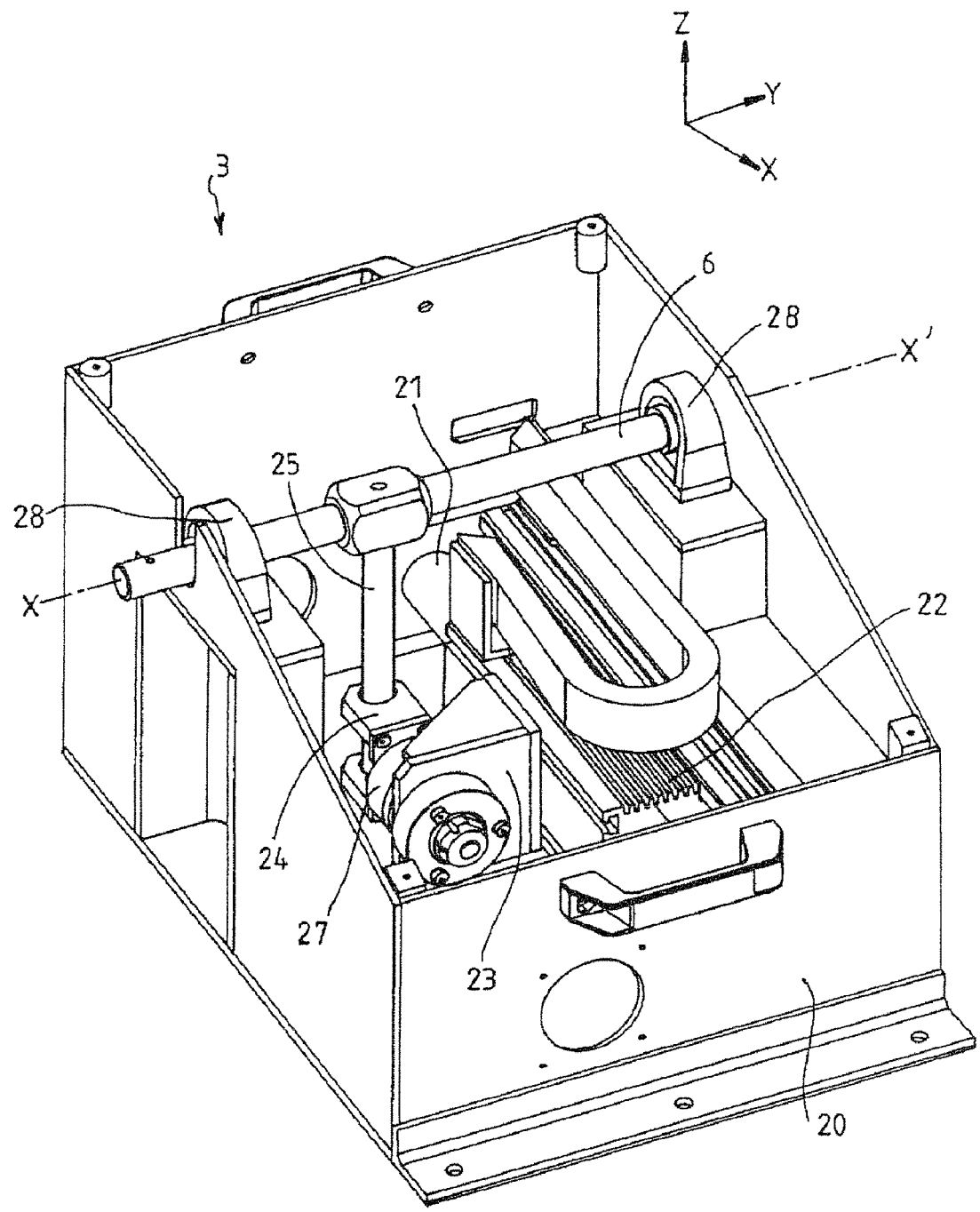
FIG. 3 is a perspective depiction of one embodiment of the horizontal selection module 3.

FIG. 3 is a perspective depiction of one embodiment of the horizontal selection module 3. In this embodiment, the horizontal selection module 3 consists of a unit 20 secured to the frame of the test bench, of a slideway 21 secured to the unit 20, of a linear motor 22 able to move along the slideway 21 along a horizontal axis, and of an arm support 23, supporting a substantially vertical arm 25 by means of a ball joint 24. The arm 25 is secured to a horizontal selection gear selection shaft 6. Rolling bearings 28 secured to the unit 20 support the gear selection shaft 6 while at the same time leaving it free to rotate about its axis. The horizontal selection module 3 also comprises a load sensor 27 allowing the load applied to the selection shaft 6 to be measured. It may, for example, be possible to use a tension/compression sensor 27 positioned between the arm support 23 and the ball joint 24.

Embodying the horizontal selection module 3 in this way allows the horizontal linear movement of the motor 22 to be converted into a rotary movement of the gear selection shaft 6 about a horizontal axis.

Figure 4:
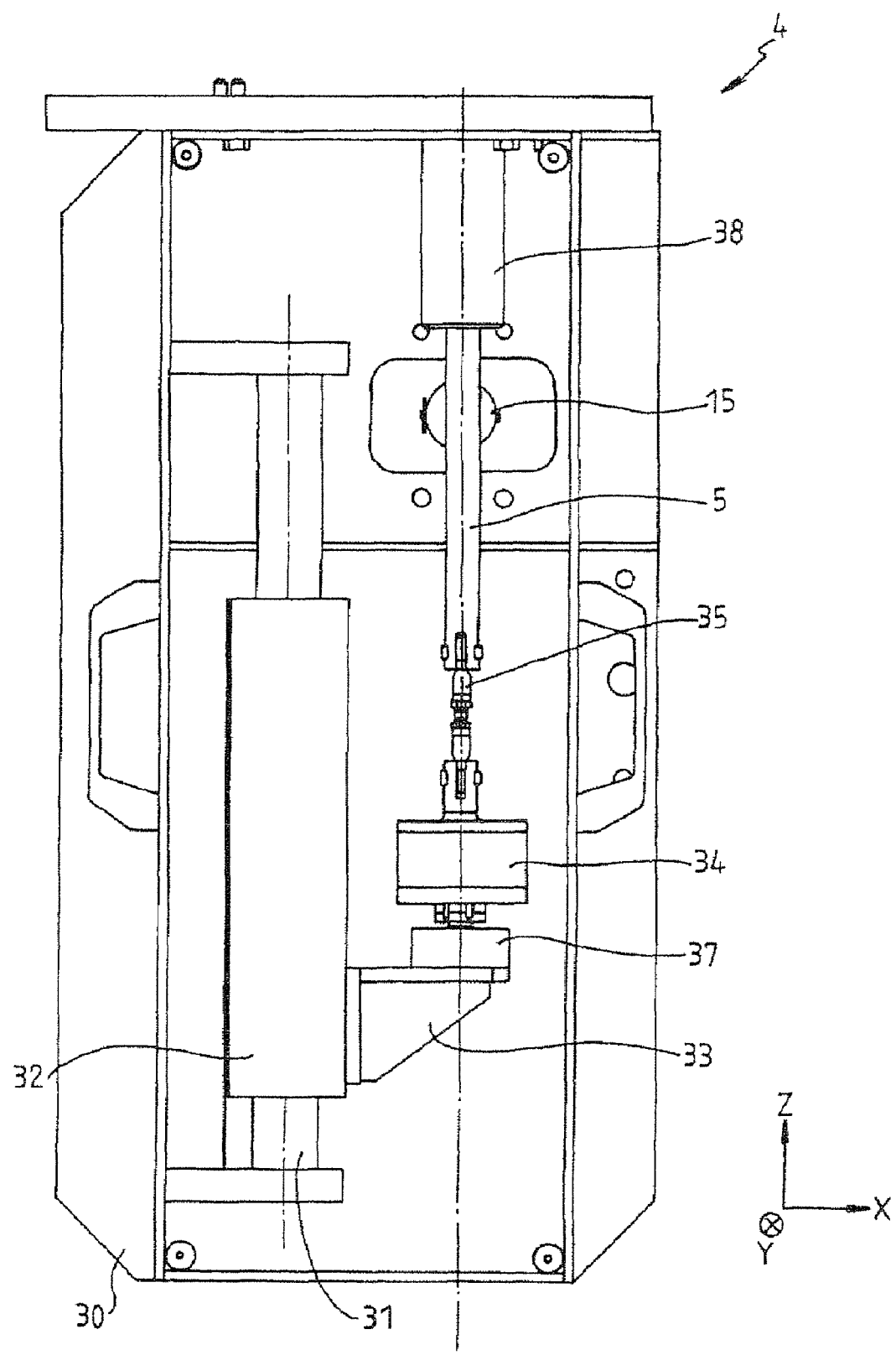
FIG. 4 is a depiction in profile of one embodiment of the vertical selection module 4.

FIG. 4 is a profile view of one embodiment of the vertical selection module 4. In this embodiment, the vertical selection module 4 consists of a unit 30 secured to the frame of the test bench, of a slideway 31 secured to the unit 30, of a vertical linear motor 32 able to move along the slideway 31 along a vertical axis, and of a connecting rod support 33 supporting a substantially vertical connecting rod 35 by means of a ball joint 34. The connecting rod 35 is secured to the control shaft 5. A sleeve 38 secured to the unit 30 supports the shaft 5 while at the same time leaving it free to rotate and to effect a translational movement along and about its axis Z. A tensile/compressive load sensor 37 positioned for example between the support 33 and the ball joint 34 allows the vertical loads supplied to the gearshift shaft 5 to be measured.

Embodying the vertical selection module 4 in this way allows the vertical linear movement of the motor 32 to be transmitted to the shaft 5 while at the same time compensating for any discrepancies using the connecting rod 35 which constitutes a compensating means. This exemplary embodiment also depicts the arm 15 of the gearshift module 2. In this particular embodiment, the gearshift shaft 5 is no longer guided by the guide device 18 secured to the plate 10 (these two items being depicted in FIG. 2) but is guided by a sleeve 38 secured to the unit 30. The sleeve 38 guides the control shaft 5 in terms of translation and in terms of rotation along and about its substantially vertical axis Z.

In this embodiment of the invention, the vertical selection module 4 is used in combination with the gearshift module 2 in the context of the simulation of a gearbox in which the gear selection and gear shift are combined. These two modules 2 and 4 therefore allow the control shaft 5 to be subjected to a load and to a torque along and about its axis Z.

The modules 2, 3 and 4 are advantageously independent of one another so that they are positioned on the test bench or omitted from the test bench according to the type of gearbox that is to be reproduced. The modules used allow the loads to be simulated as a function of position during gear selection and gearshift in a way that is representative of the behavior of a gearbox.

The invention claimed is:

1. A test bench that reproduces behavior of a gearbox, comprising:
   at least one gearshift module positioned on the test bench including a first linear motor and a first ball joint allowing a linear movement of the first linear motor to be converted into a rotary movement of a gearshift shaft attached to a gearshift lever to move the gearshift lever in a direction that is perpendicular to the linear movement of the first linear motor; and
   a first load sensor allowing the load applied to the gearshift shaft to be measured.

2. The test bench as claimed in claim 1, wherein the first linear motor can move translationally with respect to a first slideway along a horizontal axis, and the gearshift shaft pivots about a substantially vertical axis.

3. A test bench that reproduces behavior of a gearbox, comprising:
   at least one gearshift module positioned on the test bench including a first linear motor and a first ball joint allowing a linear movement of the first linear motor to be converted into a rotary movement of a gearshift shaft;
   a first load sensor allowing the load applied to the gearshift shaft to be measured;

a horizontal selection module including a second linear motor and a second ball joint allowing a linear movement of the second linear motor to be converted into a rotary movement of a selection shaft; and a second load sensor allowing the load applied to the selection shaft to be measured.

4. The test bench as claimed in claim 3, wherein the first linear motor can move translationally with respect to a first slideway along a horizontal axis, and the gearshift shaft pivots about a substantially vertical axis.

5. The test bench as claimed in claim 3, wherein the second linear motor can move translationally with respect to a second slideway along a horizontal axis, and the selection shaft pivots about its substantially horizontal axis.

6. The test bench as claimed in claim 4, wherein the second linear motor can move translationally with respect to a second slideway along a horizontal axis, and the selection shaft pivots about its substantially horizontal axis.

7. A test bench that reproduces behavior of a gearbox, comprising:

at least one gearshift module positioned on the test bench including a first linear motor and a first ball joint allowing a linear movement of the first linear motor to be converted into a rotary movement of a gearshift shaft;

a first load sensor allowing the load applied to the gearshift shaft to be measured; and a vertical selection module including a second linear motor, a tension/compression load sensor, and a compensating means.

8. The test bench as claimed in claim 2, further comprising a vertical selection module including a second linear motor, a tension/compression load sensor, and a compensating means.

9. The test bench as claimed in claim 3, further comprising a vertical selection module including a third linear motor, a tension/compression load sensor, and a compensating means.

10. The test bench as claimed in claim 4, further comprising a vertical selection module including a third linear motor, a tension/compression load sensor, and a compensating means.

11. The test bench as claimed in claim 5, further comprising a vertical selection module including a third linear motor, a tension/compression load sensor, and a compensating means.

12. The test bench as claimed in claim 6, further comprising a vertical selection module including a third linear motor, a tension/compression load sensor, and a compensating means.

13. The test bench as claimed in claim 7, wherein the second linear motor can move translationally with respect to a second slideway along a vertical axis so as to cause the gearshift shaft to move translationally along its substantially vertical axis.

14. The test bench as claimed in claim 8, wherein the second linear motor can move translationally with respect to a second slideway along a vertical axis so as to cause the gearshift shaft to move translationally along its substantially vertical axis.

15. The test bench as claimed in claim 9, wherein the third linear motor can move translationally with respect to a third slideway along a vertical axis so as to cause the gearshift shaft to move translationally along its substantially vertical axis.

16. The test bench as claimed in claim 10, wherein the third linear motor can move translationally with respect to a third slideway along a vertical axis so as to cause the gearshift shaft to move translationally along its substantially vertical axis.

17. The test bench as claimed in claim 11, wherein the third linear motor can move translationally with respect to a third slideway along a vertical axis so as to cause the gearshift shaft to move translationally along its substantially vertical axis.

18. The test bench as claimed in claim 12, wherein the third linear motor can move translationally with respect to a third slideway along a vertical axis so as to cause the gearshift shaft to move translationally along its substantially vertical axis.

19. The test bench as claimed in claim 7, wherein the first linear motor can move translationally with respect to a first slideway along a horizontal axis, and the gearshift shaft pivots about a substantially vertical axis.

20. The test bench as claimed in claim 19, wherein the second linear motor can move translationally with respect to a second slideway along a vertical axis so as to cause the gearshift shaft to move translationally along its substantially vertical axis.

* * * * *